(12) United States Patent
Bender et al.

(10) Patent No.: US 9,067,543 B2
(45) Date of Patent: Jun. 30, 2015

(54) STEERING WHEEL ASSEMBLY FOR A MOTOR VEHICLE AND METHOD FOR OPERATING A PORTABLE FUNCTIONAL COMPONENT

(75) Inventors: Jürgen Bender, Frankfurt (DE); Michael Bischoff, Rottenberg (DE); Michael Germuth-Löffler, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 1121 days.

(21) Appl. No.: 12/518,055

(22) PCT Filed: Nov. 13, 2007

(86) PCT No.: PCT/EP2007/062256
§ 371 (c)(1),
(2), (4) Date: Jun. 5, 2009

(87) PCT Pub. No.: WO2008/068131
PCT Pub. Date: Jun. 12, 2008

(65) Prior Publication Data
US 2010/0321200 A1    Dec. 23, 2010

(30) Foreign Application Priority Data
Dec. 5, 2006   (DE) .......................... 10 2006 058 362

(51) Int. Cl.
*B60Q 1/00*    (2006.01)
*B60R 11/02*   (2006.01)
*B60R 11/00*   (2006.01)

(52) U.S. Cl.
CPC ........... *B60R 11/02* (2013.01); *Y10T 74/20834* (2015.01); *B60R 11/0264* (2013.01); *B60R 2011/001* (2013.01)

(58) Field of Classification Search
USPC ....................... 340/1.1, 4.3, 426.31, 438, 461
See application file for complete search history.

(56) References Cited

U.S. PATENT DOCUMENTS 6,340,928 B1 *   1/2002   McCurdy ...................... 340/436
6,687,517 B2 *   2/2004   Kinnunen .................. 455/569.1
(Continued)

FOREIGN PATENT DOCUMENTS

CN    2511573 Y    9/2002
CN    2527486 Y    12/2002
(Continued)

OTHER PUBLICATIONS

English translation of the International Preliminary Report on Patentability (Chapter I or II of the Patent Cooperation Treaty) from the International Bureau of WIPO for International Application No. PCT/EP2007/062256 dated Jul. 16, 2009, 8 pages.
(Continued)

*Primary Examiner* — James Yang
(74) *Attorney, Agent, or Firm* — Fitch Even Tabin & Flannery LLP

(57) ABSTRACT

A steering wheel assembly is provided for a motor vehicle, including at least one actuating element disposed on the steering wheel for the actuation of a first functional component of the motor vehicle installed in the motor vehicle, and an electronic control unit configured to associate the actuating element with a portable second functional component located in an effective environment of the unit, for being actuated thereby. A method is providing for operating a portable second functional component in a motor vehicle including providing a steering wheel assembly having a plurality of user-operated actuating elements and selecting at least one actuating element from the number of available actuating elements by means of the portable second functional component.

23 Claims, 1 Drawing Sheet

(56) References Cited

U.S. PATENT DOCUMENTS

| | | | |
|---|---|---|---|
| 7,248,901 | B2 | 7/2007 | Peiker |
| 2002/0068605 | A1* | 6/2002 | Stanley .................. 455/556 |
| 2003/0023353 | A1* | 1/2003 | Badarneh ..................... 701/1 |
| 2004/0122564 | A1 | 6/2004 | Ogasawara |
| 2005/0021190 | A1* | 1/2005 | Worrell et al. ................ 701/1 |
| 2005/0068191 | A1 | 3/2005 | Eschke et al. |
| 2006/0198520 | A1* | 9/2006 | Courtney et al. ........... 380/247 |
| 2008/0133084 | A1 | 6/2008 | Weinmann et al. |

FOREIGN PATENT DOCUMENTS

| | | |
|---|---|---|
| DE | 297 02 001 U1 | 5/1997 |
| DE | 200 20 227 U1 | 5/2001 |
| DE | 100 04 965 A1 | 8/2001 |
| DE | 102 01 612 A1 | 7/2002 |
| DE | 101 44 780 A1 | 4/2003 |
| DE | 103 58 928 A1 | 7/2004 |
| DE | 10 2005 023 544 A1 | 12/2006 |
| EP | 1 125 784 B1 | 8/2001 |
| EP | 1 184 225 A1 | 3/2002 |
| EP | 1 375 972 A1 | 1/2004 |
| EP | 1 502 835 A1 | 5/2005 |
| FR | 2 751 287 A1 | 1/1998 |
| GB | 2 359 965 A | 9/2001 |
| GB | 2 424 854 A | 10/2006 |
| JP | H10-276261 A | 10/1998 |
| JP | 2001-239897 A | 9/2001 |
| JP | 2003-063326 A | 3/2003 |
| JP | 2003-531046 A | 10/2003 |
| JP | 2005-132341 A | 5/2005 |
| JP | 2006-205866 A | 8/2006 |
| JP | 2006-222791 A | 8/2006 |
| RU | 2 096 196 C1 | 11/1997 |
| RU | 2000118328 A | 7/2002 |
| WO | 99/30429 A1 | 6/1999 |
| WO | 02/057117 A2 | 7/2002 |

OTHER PUBLICATIONS

Office Action issued in counterpart Japanese Application No. 2009-535754 dated Aug. 28, 2012 (2 pages) and an English translation of the same (1 page).

* cited by examiner

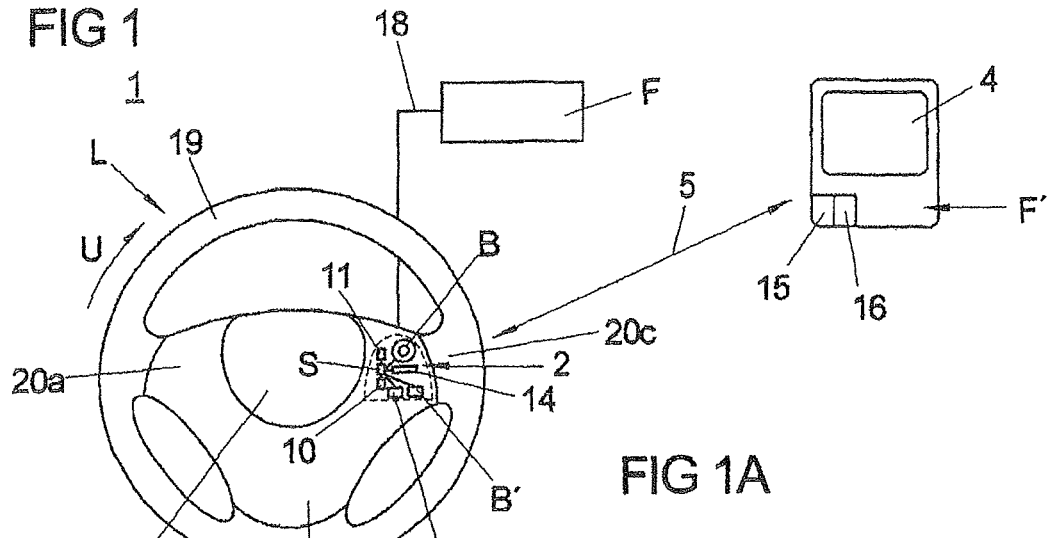
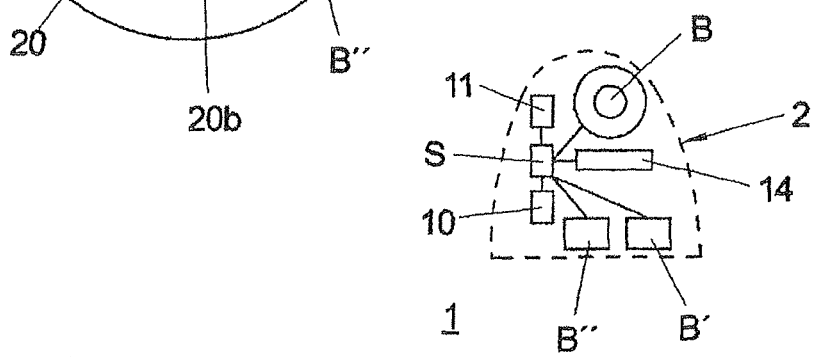
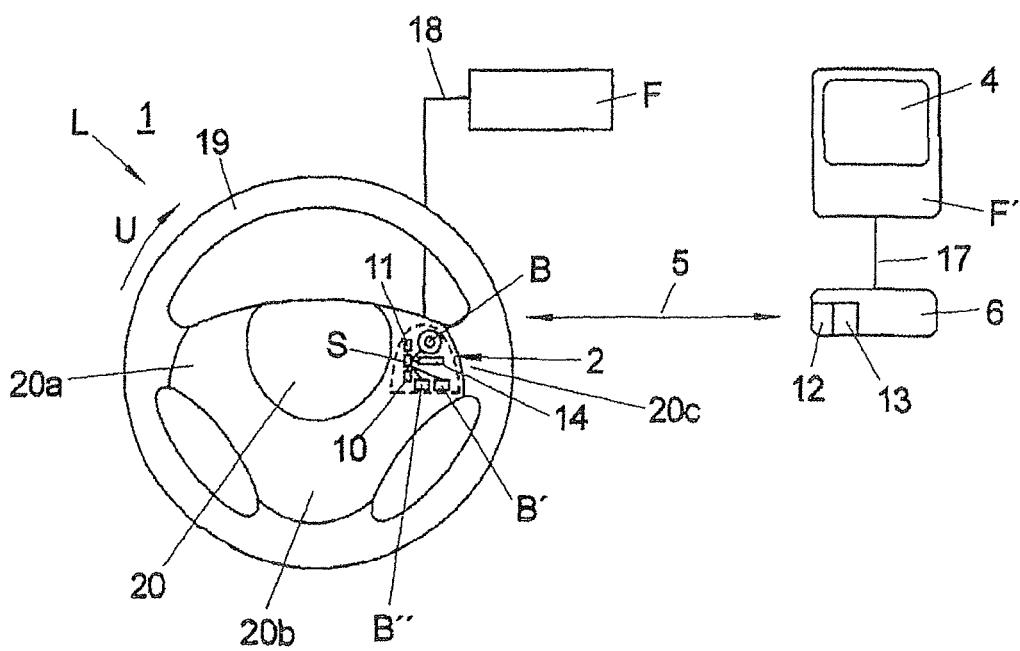

STEERING WHEEL ASSEMBLY FOR A MOTOR VEHICLE AND METHOD FOR OPERATING A PORTABLE FUNCTIONAL COMPONENT

CROSS-REFERENCE TO RELATED APPLICATIONS

This application is a U.S. national phase application filed under 35 U.S.C. §371 of International Application PCT/EP2007/062256, filed on Nov. 13, 2007, designating the United States, which claims priority from DE 10 2006 058 362.0, filed Dec. 5, 2006, which are hereby incorporated herein by reference in their entirety.

FIELD OF THE INVENTION

The invention relates to a steering wheel assembly for a motor vehicle and to a method for operating a portable functional component in a motor vehicle.

BACKGROUND OF THE INVENTION

Known steering wheel assemblies comprise a steering wheel for controlling a motor vehicle and at least one actuating element which is arranged on the steering wheel and is configured and provided for actuating at least one first functional component of the motor vehicle, which is installed in the motor vehicle. A functional component which is installed in a motor vehicle is understood here to be a functional component such as, for example, a car radio or a navigation system which is configured and provided for continuous operation in a motor vehicle and to remain in a motor vehicle. Furthermore, such steering wheel assemblies have an electronic control unit which is coupled to the actuating element, has the purpose of controlling the actuating element and generates, as a function of actuation of the actuating element, output signals for acting on the first functional component. For example, an actuation element of the steering wheel assembly is embodied as a toggle switch (joystick), momentary contact switch or rotary controller or rotary selection controller and integrated into the steering wheel.

SUMMARY OF THE INVENTION

The invention is based on the problem of providing a steering wheel assembly whose flexibility is improved with respect to the operation of functional components.

This problem is solved by means of a steering wheel assembly having the features as discussed hereinafter.

Accordingly there is provision that the electronic control unit is configured and provided to assign the actuating element to a portable second functional component which is positioned in the effective surroundings of the electronic control unit, with the result that the portable second functional component can be actuated by means of the actuating element.

The solution according to the invention permits portable functional components, in particular in the form of satellite controlled navigation systems (for example GPS) to be easily controlled by means of the steering wheel, with no mounting of additional components on the steering wheel being required.

The second functional components, instead of the first functional components, are preferably actuated with the actuating element, i.e. there is switching over of the actuating element from the first functional component to the second (mobile) functional component.

The portable second functional components (portable MP3 player, PDA, etc.) are, in contrast to the first functional components, not provided for fixed installation in a motor vehicle and differ in this from the first functional components. In particular, the second mobile functional components are not connected to a vehicle-mounted electronic system via a line connection.

The electronic control unit is, like the at least one actuating element, preferably arranged in the steering wheel. As a result, the steering wheel assembly according to the invention has an advantageously high degree of integration. Since the electronic control unit is preferably designed to exchange data with the portable second functional component via a signal transmitting link embodied for wireless exchange of data, there is no need for a line link to be provided between the portable second functional component and a vehicle-mounted electronic system in the motor vehicle.

In this way, the steering wheel assembly according to the invention permits flexible use of the portable devices (functional components) in motor vehicles of all types, also agricultural machinery and construction machinery.

For the wireless transmission of data to the second functional component, the electronic control unit has a transmitting unit to which a receiving unit is assigned at the portable second functional component. Furthermore, the electronic control unit has, for the wireless reception of data, a receiving unit which is assigned a transmitting unit at the second functional component. The above-mentioned transmitting and receiving units respectively form an element of the signal transmitting link which is in particular a radio link, capacitive link, inductive link, infrared link or ultrasonic link.

The spatial extent of the effective surroundings of the electronic control unit is therefore defined by the range of the signal transmitting link, with the range being preferably limited to an interior space of a motor vehicle in which the steering wheel assembly is to be arranged.

In order to operate the first or second functional component, in the event of actuating of the actuating element which adjusts the actuating element into a specific setting (or plurality of possible settings), an output signal for acting on a functional component is assigned in a uniquely defined fashion by the electronic control unit to the respectively set setting of the actuating element. In the event of no second functional component being arranged in the effective surroundings of the control unit or of control of the second functional unit by means of the actuating element being undesired, the electronic control unit transmits these output signals to the first functional component and brings about there a change in a setting or an operating state of the first functional component. In particular, the first functional component can be controlled in a comprehensive fashion in this way. This includes, inter alia, activation, deactivation and control of the individual functions of the first functional component. In the case of a first functional component in the form of a car radio, it is possible, for example, to use the actuating unit to set the volume or the frequency of the transmitter to be received, etc. In the case of a first functional component in the form of a permanently installed navigation system (for example, GPS), it is possible to use the actuating element, in particular to input or interrogate destinations and routes. The output signals can be transmitted to the first functional component via a line link or via a wireless link.

The electronic control unit is preferably designed to transmit, in response to a first identifier transmitted by the second functional component to the electronic control unit via the signal transmitting link, a second identifier via the signal transmitting link to the second functional component in which at least the number of actuating elements which are available for operating the second functional component is encoded.

Furthermore, the electronic control unit is preferably configured and provided for assigning, in response to a corresponding (positive) response signal, brought about by the user, of the second functional component—which response signal is transmitted from the second portable functional component to the electronic control unit via the signal transmitting link—the output signals to the second functional component, with the result that the portable second functional component can be actuated instead of the first functional component, permanently installed in the motor vehicle, by means of the actuating element, as described above.

For the purpose of assigning the output signals to the second functional component, the electronic control unit is designed, in particular to transmit a second identifier in the form of a signal to the second functional component in which, in addition to the number of available actuating elements, the respectively possible settings of an actuating element and the output signals assigned to the settings and to the actuating elements, are also encoded, with the result that the first functional unit which receives the output signals is enabled to correspondingly implement the output signals in order to actuate its individual functions, i.e. in order to change its operating state.

The output signals which are assigned to the second functional component are transmitted from the electronic control unit to the second functional component by means of the transmitting unit of the electronic control unit, i.e. via the signal transmitting link.

The actuating element which is formed from the actuating element and the electronic control unit and is arranged in the steering wheel therefore implements the function of communication with a mobile (second) functional component via a wireless link. Only if a portable, second functional component is placed in the vicinity, i.e. in the effective surroundings of the electronic control unit indicated in the steering wheel, is a check carried out to determine whether switching over of the actuating element from the first to the second functional components is to be performed. The communication between the portable second functional component and the electronic control unit takes place independently of the vehicle electronics. that is to say, the operation of a second functional component by means of the actuating element constitutes an additional functionality of the actuating unit or steering wheel assembly which can be implemented independently of a motor vehicle electronic unit and motor vehicle communications structure.

In one variant of the invention, an adaptor unit which is to be arranged in the effective range of the electronic control unit and which is connected to the electronic control unit via the signal transmitting link is provided. This adaptor unit is configured and provided to be connected to the second mobile functional component with the result that the adaptor unit can receive data from the second functional component and transmit it to the second functional component, i.e. the adaptor unit forms both an interface with the electronic control unit and with the portable, second functional component. The advantage of this variant of the invention consists, in particular, in the fact that already existing second functional components which are not yet configured for communication with the electronic control unit via the signal transmitting link can also be connected to the electronic control unit, with the result that they can be operated by means of the at least one actuating element. In this context, in particular an existing interface of the second functional component is used for the connection to the adaptor unit.

The adaptor unit itself is then designed to implement the response signal of the second functional component with which the user authorizes the switching over of the at least one actuating element, and to transmit said signal to the electronic control unit in a wireless fashion, in such a way that the electronic control unit assigns the output signals to the second functional component in response to the implemented response signal. In order to transmit the signal (if appropriate convert it) of the second functional component to the control unit, the adaptor unit has a transmitting unit which constitutes an element of the signal transmitting link between the control unit and the adaptor unit.

The output signals which are assigned to the second functional component by the electronic control unit as a result of the response signal of the second functional component are transmitted by the electronic control unit via the signal transmitting link to the adaptor unit which is preferably designed to implement the output signals and transmit them to the second functional component in such a way that the second functional component can be actuated by means of the actuating element.

The assignment which is performed by means of the electronic control unit includes in this context, as described above, the fact that the electronic control unit is designed to transmit a second identifier in the form of a signal to the adaptor unit in which, in addition to the number of available actuating elements, the respective possible settings of an actuating element and the output signals assigned to the settings are encoded in a uniquely defined fashion, with the result that the adaptor unit which receives the output signals is enabled to correspondingly implement the output signals in order to actuate the individual functions of the second functional component and to transmit them to the second functional component.

In one embodiment of the invention, a display element for displaying information, which element is, in particular, a visual display (displays, LED, etc.) is provided on the at least one actuating element. So that it is clear to a user which functions or parameters of a functional component can be set (changed) with the actuating element, the electronic control unit is configured and provided for displaying an operating state, which can be set by means of the actuating element, of the first or second functional component (for example, the volume of a functional component in the form of an audio device) by means of the display element, in particular as a symbol in the form of a pictogram. Alternatively, short terms (words) can be displayed in a predeterminable language, which terms describe in a uniquely defined fashion, the respective parameter (operating state) to be set for the respective functional component. A voice announcement is also conceivable.

In a further embodiment of the invention, a (portable) second functional component which is matched individually to the steering wheel assembly is provided, which second functional component is to be arranged in the effective surroundings of the control unit in the motor vehicle and is embodied, in particular as one of the following functional components: a portable navigation device, in particular satellite controlled, for displaying a route, a portable PDA (Personal Digital Assistant), a mobile phone, a portable audio device, in particular MP3 player, or a portable PC (Notebook).

This second functional component is preferably configured and provided for transmitting its operating state, to be displayed by means of the display element, to the control unit via the signal transmitting link. In order to transmit data which characterizes the respective operating state to be displayed, the second functional component has a transmitting unit which constitutes a component of the signal transmitting link between the second functional component and the control unit.

The at least one permanently installed first functional component is preferably embodied as one of the following functional components: a car radio, a telephone, an on-board computer or a navigation device (for example GPS).

In one variant of the invention a plurality of actuating elements is integrated into the steering wheel, which actuating elements serve to actuate at least a first functional component which is installed in the motor vehicle. In this case, the electronic control unit is designed to assign a group from the totality of actuating elements to a portable second functional component which is located in the effective surroundings of the electronic control unit, with the result that the portable second functional component can be actuated instead of at least a first functional component by means of the group of actuating elements.

Furthermore, the problem according to the invention is solved by means of a method for operating a portable functional component having a steering wheel assembly according to the invention. The method according to the invention comprises the following steps:

provision of a steering wheel assembly, having at least one actuating element which is arranged on the steering wheel and is configured and provided for actuating at least one first functional component of the motor vehicle, which is installed in the motor vehicle and has an electronic control unit which interacts with the actuating element and has the purpose of controlling the actuating element, reception of a first identifier of the portable second functional component by the electronic control unit, in particular via a signal transmitting link which is designed for the wireless transmission of signals, subsequent transmission of a second identifier back to the portable functional component by the electronic control unit, in particular via the signal transmitting link, in which case at least the number of actuating elements available at the steering wheel for operating the second functional component is encoded in the identifier, and selection of at least one actuating element from the number of available actuating elements of the steering wheel by means of the portable, second functional component.

The method according to the invention advantageously therefore permits flexible use of additional portable functional components in an easy way without installation work on the motor vehicle having to be carried out retrospectively.

The first identifier is preferably generated by the second functional component in the form of a signal at a user's (driver's) instigation and transmitted to the electronic control unit in a wireless fashion.

In response to the second identifier of the electronic control unit, preferably the second functional component is used to generate, at the user's instigation, a response signal in which the user's desire to switch over the at least one actuating element to the second functional component (positive response) or not switch over (negative response) is encoded. This response signal is transmitted in a wireless fashion to the electronic control unit in order to assign the at least one actuating element to the second functional component. When there are a plurality of available actuating elements, in particular which actuating elements are to be used for controlling the second functional component is encoded in the response signal.

Furthermore, in one variant of the method, there is provision that the signal transmitting link is enabled by inputting an enabling code. The inputting of the enabling code is preferably carried out by means of the at least one actuating element on the steering wheel or on the second functional component. The input, i.e. the enabling code, is displayed by means of a display element of an actuating element or the second functional component (in particular mobile navigation device).

There is also the possibility of using the enabling process for billing licensing or installation costs for the operation of the portable second functional component in the motor vehicle.

An output signal for acting on the first or second functional component is assigned, by means of the electronic control unit, to the different settings of the actuating element into which the actuating element can be adjusted manually. The assignment of the different settings to the output signals and the total number of possible settings of an actuating element are preferably also encoded in the identifier which the control unit transmits to the second portable functional component, with the result that the second functional component can perform simple and efficient assignment of the output signals to the individual operating states of the second functional component.

The method according to the invention also provides that the electronic control unit assigns the output signals for actuating the first functional component to the first functional component, which is permanently installed in the motor vehicle, until the (positive) response signal described above, from the second functional component, is received by the electronic control unit. After the reception of a positive response, the electronic control unit transmits the output signals in a wireless fashion to the second functional component with the result that the second functional component can be actuated by means of the actuating element.

For the sake of better clarity, one variant of the method according to the invention provides that an operating parameter, to be set by means of the actuating element, of the second functional component is displayed as a symbol by means of at least one display element which is provided on the at least one actuating element. However, this occurs only if the at least one actuating element is assigned to the second functional component.

The symbol to be displayed is made available here by the second functional component and transmitted by it in a wireless fashion to the electronic control unit which is connected to the display element. Instead of a visual display of a symbol, a voice announcement, which describes the changed operating state of the second functional component when the actuating element is actuated, is also possible.

The output signals assigned to the second functional component are assigned again to the first functional component, with the result that the first functional component can be operated by means of the at least one actuating element if the second portable functional component is removed from the effective surroundings which are defined by the range of a signal transmitting link between the electronic control unit and the second functional component. Furthermore, the output signals are assigned again to the first, permanently installed functional component if a corresponding abort signal is transmitted to the electronic control unit at a user's instigation by means of the second functional component.

When there is a first functional component which is configured and provided for outputting acoustic signals, acoustic signals of the second functional component are preferably played back by means of the first functional component if the actuating element is assigned to the second functional component.

Likewise, when an acoustic signal is played back by the second functional component, an acoustic indication of the first functional component is preferably switched to mute if the at least one actuating element is assigned to the second functional component.

BRIEF DESCRIPTION OF THE DRAWINGS

Further features and advantages of the invention will be clarified in the following description of exemplary embodiments and on the basis of the figures, in which:

FIG. 1: is a schematic view of a steering wheel assembly, having a steering wheel and an actuating element which is arranged on the steering wheel, wherein the actuating element is configured and provided for setting a first functional component, to be permanently installed in the motor vehicle, and for operating a second portable functional component instead of the first functional component;

FIG. 1A: shows a detail of the steering wheel assembly illustrated in FIG. 1; and FIG. 2: shows a schematic view of a modification of the steering wheel assembly shown in FIG. 1 and in which, in contrast to FIG. 1, the second functional component is connected to the actuating element via an adaptor unit.

DETAILED DESCRIPTION OF THE PREFERRED EMBODIMENTS

FIG. 1 shows, in conjunction with FIG. 1A, a schematic illustration of a steering wheel assembly 1 which is to be arranged in a motor vehicle and has a steering wheel L, a compact actuating unit 2, comprising actuating elements B, B', B" which are integrated into the steering wheel L, and an electronic control unit S which is arranged in the steering wheel, connected to the actuating elements B, B', B" and has the purpose of driving the actuating elements B, B', B", wherein the actuating elements B, B', B" are, on the one hand, configured and provided for operating a first functional component F which is permanently installed in the motor vehicle, and on the other hand, can be assigned at least partially to a second mobile functional component F', with the result that the second functional component F' can be actuated instead of the first functional component F with the actuating elements B, B', B" which are assigned to it. For this purpose, the second portable functional component F' is connected to the control unit S via a signal transmitting link 5 which is designed for the wireless transmission of information.

The steering wheel L has a steering wheel rim 19 which runs around in a circumferential direction U and which is connected via three spokes 20a, 20b, 20c to a hub body 20 of the steering wheel L, via which hub body 20 the steering wheel L is to be mounted on a motor vehicle so as to be rotatable about a rotational axis which is oriented transversely with respect to the circumferential direction U of the steering wheel rim 19. In the straight-ahead travel position of the steering wheel L—with respect to an installation state of the steering wheel L—two spokes 20a, 20c of the steering wheel L run along the horizontal transverse axis extending in opposite directions from the hub body 20 to the steering wheel rim 19 and open into said steering wheel rim 19. In the straight-ahead travel position of the steering wheel L, a third spoke 20b connects the hub body 20 to the steering wheel rim 19 along the vertical axis of the vehicle.

The actuating elements B, B', B" are let into a spoke 20c which is denoted as the first spoke and which, viewed by a driver who is operating the steering wheel L, is arranged on the right-hand side of the steering wheel L, with respect to the straight-ahead travel position of the steering wheel L. By virtue of this arrangement, the actuating elements B, B', B" can also be reached with a thumb if both hands are engaged around the steering wheel rim 19 during travel.

A first of the actuating elements is embodied as a rotary selection switch B which is mounted on the first spoke 20c so as to be capable of rotating in the circumferential direction U or opposed thereto, and it can therefore be adjusted into a plurality of different settings by (manual) rotation in the circumferential direction U.

Alternatively, the first actuating element B can be embodied as a joystick which can be tilted into a plurality of different directions which each run transversely with respect to the rotational axis, and said joystick can therefore be set to a plurality of settings (tilted state, in different directions).

Furthermore, two second actuating elements B', B" which are embodied as momentary contact switches are provided, which actuating elements B, B' are preferably arranged, with respect to the straight-ahead position of the steering wheel, in a vertical direction underneath the first actuating element B and which can be moved into an actuating position from a position of rest by pressing in a direction which points to the steering wheel L. The momentary contact switches can be configured here to latch in, in the actuating position, wherein they return to their respective position of rest through further actuation. Alternatively, when the pressure abates, the momentary contact switches are returned immediately to the position of rest. As a result, the momentary contact switches can therefore be set to two different settings.

When one of the actuating elements B, B', B" is actuated, a display element 14 which is arranged underneath the first actuating element B is used to display the function of a functional component F, F' which is being controlled by the actuation or a parameter (for example, volume) which is assigned to the function as well as the instantaneous (adjusted) value of the parameter. Alternatively, the operating state of the mobile second functional component F' can also be displayed by means of a display element 4 of the permanently installed, first component.

The actuating elements B, B', B" are used, inter alia, for actuating the first functional component F which is to be permanently installed in the motor vehicle and which can be, for example, a car radio, and for this purpose said actuating elements B, B', B" are coupled to the first functional component F via the electronic control unit S. The electronic control unit S is designed in each case to assign, in a uniquely defined fashion, an output signal which is generated by the electronic control unit S to the different settings of the respective actuating elements B, B', B" and to transmit said output signal to the first functional component F in order to act on the first functional component, i.e. to adjust the first functional component F (activation, deactivation and control). The electronic control unit S is preferably also configured here to assign the output signals to a functional component F, F' as a function of an actuating period of one of the actuating elements B, B', B" that is to say, for example, as a function of the time period during which one of the second actuating elements B', B" is in the actuating position. This opens up, in theory, the possibility, in one development of the invention, of simultaneously assigning the actuating elements B, B', B" to both functional components F, F', in which case, for example, the second functional component F' is addressed only if the corresponding actuating element B, B', B" is in a specific setting (actuating position) continuously during a predeterminable time period.

In order to transmit the output signals to the first functional component F, the electronic control unit S is connected to the first functional component F via a line link 18.

If a portable second functional component F, for example in the form of a mobile navigation system which is not permanently installed is moved into a spatial effective range of the electronic control unit S, for example, into an interior space of a motor vehicle in which the steering wheel assembly 1 is to be arranged, the electronic control unit S can receive a first identifier, transmitted automatically by the second functional component F or at the instigation of a person (for example driver), which identifier indicates to the electronic control unit S that the second functional component F' is in its effective area.

In order to transmit this first identifier, a signal transmitting link 5, which is configured for wireless exchange of data and which has a transmitting and a receiving unit 10, 11 and respectively 15, 16, respectively at the control unit S and at the second functional component F' is provided between the control unit S and the second functional component.

The electronic control unit S is designed, given reception of this first identifier, to transmit back a second identifier via the signal transmitting link 5, which second identifier contains information about the number of available actuating elements B, B', B" as well as the number of possible settings of an actuating element B, B', B".

Subsequently, the user (for example driver) decides, at the second functional component F', which of the actuating elements B, B', B" is to be switched over from the first functional component F to the second functional component F'. For this purpose, a corresponding response signal is transmitted to the electronic control unit S via the signal transmitting link at a user's instigation (for example, driver) by means of the second functional component F'.

The electronic control unit S is then designed, given reception of a positive response signal, to assign the output signals of the second functional component F' and to transmit them to said functional component F' via the signal transmitting link 5, in such a way that the second functional component F' can be operated by means of the selected actuating elements B, B', B". This switching over of the actuating elements B, B', B" is reversed when the second functional component F' is removed from the effective surroundings of the electronic control unit S. Furthermore, the switching over is rescinded by means of a manual input which is performed at the second functional component F'. For safety reasons, the electronic control unit S is configured to permit switching over of the actuating elements B, B', B" only in the state of rest of the motor vehicle.

FIG. 2 shows, in conjunction with FIG. 1A, a modification of the steering wheel assembly 1 which is shown in FIG. 1 and in which, in contrast to FIG. 1, the second functional component F' is not directly connected to the electronic control unit S via the signal transmitting link 5 but rather via an adaptor unit 6 which itself has a transmitting unit 12 and a receiving unit 13, in order to form, together with the transmitting unit 10 or receiving unit 11 assigned to the control unit S a signal transmitting link 5 which is configured for the wireless exchange of data. In order to connect the adaptor unit 6 to the second, portable functional unit F' a line connection 17 is provided.

The use of the adaptor unit 6 has the advantage that portable second functional components F' can also be embedded in the steering wheel assembly 1, which functional components F' are, per se, not configured to communicate independently with the electronic control unit S via the signal transmitting link 5. Adaptation or conversion of the signals exchanged between the second functional component F' and the electronic control unit S is performed by the adaptor unit 6 when there is such a second functional component F'.

The presence of the second functional component F' can be detected by means of the adaptor unit 6. If a second functional component F' is connected to the adaptor unit 6 via the line link 17, said adaptor unit 6 transmits the first identifier to the electronic control unit S and then receives the second identifier of the electronic control unit S via the signal transmitting link 5. Said second identifier is adapted to the second functional component F' by the adaptor unit 6, with the result that the respective actuating elements B, B', B" and the number of possible settings of these actuating elements are known there.

At the second functional component F', the user can then select specific actuating elements B, B', B" for actuating the second functional component F' and said user can enable the switching over of the selected actuating elements from the first functional component to the second functional component F'. The corresponding response signal is transferred by the second functional component F' to the adaptor unit 6 and adapted by it to the electronic control unit S and transmitted thereto via the signal transmitting link 5.

The electronic control unit S subsequently transmits the corresponding output signals, generated when the selected actuating elements are actuated, to the second functional component F' via the adaptor unit 6, wherein the adaptor unit 6 performs suitable adaptation of the output signals to the second functional component F', with the result that the second functional component F' can be operated by means of the selected actuating elements B, B', B".

The invention claimed is:

1. A steering wheel assembly for a motor vehicle comprising:
    a steering wheel,
    a plurality of user-operated actuating elements, each arranged on the steering wheel and configured to be operable for actuating corresponding functional components of the motor vehicle-installed in the motor vehicle, and
    an electronic control unit configured to control the actuating elements and to reconfigure and assign at least one of the user-operated actuating elements that is selected by a user to at least one portable second functional component, positioned in the effective surroundings of the electronic control unit and that is not provided to be fixedly installed in the motor vehicle, so that the at least one user-operated actuating element is operable to actuate the portable second functional component with the electronic control unit being further configured to exchange data with the portable second functional component via a signal transmitting link, configured for wireless exchange of data, to reconfigure and assign the at least one user-operated actuating element to the second functional component based on the wireless exchange of data therebetween, characterized in that:
    the electronic control unit is configured to transmit, in response to a first identifier transmitted by the second functional component to the electronic control unit via the signal transmitting link, a second identifier via the signal transmitting link to the second functional component in which at least the number of the user-operated actuating elements which are available for operating the second functional component is encoded, and further characterized in that:

the at least one user-operated actuating element has a plurality of settings which are each assigned an output signal of the electronic control unit for acting on the first functional component characterized in that the electronic control unit is configured for assigning the output signals to the second functional component in response to a response signal transmitted at the user's instigation from the second functional component to the electronic control unit via the signal transmitting link with the response signal corresponding to the at least one user-operated actuating element that is selected by the user, so that the at least one user-operated actuating element is operable to actuate the portable second functional component instead of the first functional component.

2. The steering wheel assembly as claimed in claim 1, characterized in that the electronic control unit is configured to assign the one actuating element to the at least one portable second functional component so that the one actuating element is operable to actuate the portable second functional component instead of the first functional component.

3. The steering wheel assembly as claimed in claim 1 or 2, characterized in that the electronic control unit is arranged in the steering wheel.

4. The steering wheel as claimed in claim 1, characterized in that the electronic control unit has, for the wireless transmission of data to the second functional component, a transmitting unit as a component of the signal transmitting link.

5. The steering wheel as claimed in claim 4, characterized in that the electronic control unit has, for the wireless reception of data from a portable second functional component, a receiving unit as a component of the signal transmitting link.

6. The steering wheel assembly as claimed in claim 1, characterized in that the effective surroundings of the electronic control unit is defined by the range of the signal transmitting link, wherein the effective surroundings are limited to an interior space of a motor vehicle in which the steering wheel assembly is to be arranged.

7. The steering wheel assembly as claimed in claim 1, characterized in that the electronic control unit is designed to transmit the output signals for the actuation of the first functional component to the first functional component.

8. The steering wheel assembly as claimed in claim 4, characterized in that the electronic control unit is configured to use the transmitting unit to transmit to the second functional component output signals which are assigned to the second functional component.

9. The steering wheel assembly as claimed in claim 1, characterized by an adaptor unit which is to be arranged in the effective range of the electronic control unit, is connected to the electronic control unit via the signal transmitting link and is configured and provided to be connected to the second functional component with the result that the adaptor unit can receive data from the second functional component and transmit data to the second functional component.

10. The steering wheel assembly as claimed in claim 9, characterized in that the adaptor unit is designed to transmit a response signal of the second functional component to the electronic control unit in order to cause the electronic control unit to assign output signals to the second functional component so that the one actuating element is operable to actuate the second functional component.

11. The steering wheel assembly as claimed in claim 10, characterized in that the adaptor unit has, for the transmission of the response signal, a transmitting unit as part of the signal transmitting link.

12. The steering wheel assembly as claimed in claim 10 or 11, characterized in that the adaptor unit is configured to be operable to receive the output signals from the electronic control unit and to convert and transmit the converted output signals to the second functional component so that the one actuating element is operable to actuate the second functional component.

13. The steering wheel assembly as claimed in claim 12, characterized in that the adaptor unit has, for the reception of the output signals, a receiving unit as part of the signal transmitting link.

14. The steering wheel assembly as claimed in claim 1, characterized in that the one actuating element has a display element for displaying information.

15. The steering wheel assembly as claimed in claim 14, characterized in that the electronic control unit is configured to display an operating state of the first or second functional component using the display element, and the one actuating element is operable to vary the operating state to be displayed.

16. The steering wheel assembly as claimed in claim 1, characterized by a second functional component which is designed, in particular as one of the following functional components:
   a portable navigation device, in particular satellite controlled, for displaying a route,
   a portable PDA,
   a mobile phone,
   a portable audio device, in particular MP3 player, or
   a portable PC (Notebook).

17. The steering wheel assembly as claimed in claim 1, characterized in that the second functional component is designed to transmit the operating state, to be displayed by means of a display element, to the control unit via the signal transmitting link, in order to display the operating state by means of the display element.

18. The steering wheel assembly as claimed in one of claim 16 or 17, characterized in that the second functional component has a transmitting unit as a component of the signal transmitting link.

19. The steering wheel assembly as claimed in claim 18, characterized in that the second functional component is configured to use the transmitting unit to transmit to the electronic control unit the operating state which is to be displayed, in order to display the operating state by means of the display element.

20. The steering wheel assembly as claimed in claim 11, characterized in that the adaptor unit is designed to transmit, via its transmitting unit, the operating state to be displayed to the electronic control unit.

21. The steering wheel assembly as claimed in claim 1, characterized in that the first functional component is embodied as one of the following functional components:
   a car radio,
   a telephone,
   an on-board computer, and
   a navigation device.

22. The steering wheel as claimed in claim 1, characterized in that a plurality of actuating elements are arranged on the steering wheel, which actuating elements are configured and provided for actuating at least a first functional component which is installed in the motor vehicle.

23. The steering wheel as claimed in claim 22, characterized in that the electronic control unit is configured to assign a group from the totality of the actuating elements to a portable second functional component located in the effective surroundings of the electronic control unit, so that the group of actuating elements is operable to actuate the portable second functional component instead of at least a first functional component.

* * * * *